US006707980B2

(12) United States Patent
Holman et al.

(10) Patent No.: US 6,707,980 B2
(45) Date of Patent: Mar. 16, 2004

(54) VARIABLE ATTENUATOR FOR OPTICAL FIBER APPLICATIONS

(75) Inventors: Ryan Robert Holman, Lawrenceville, GA (US); David Nolan Ridgway, Conyers, GA (US)

(73) Assignee: Fitel USA Corp., Norcross, GA (US)

( * ) Notice: Subject to any disclaimer, the term of this patent is extended or adjusted under 35 U.S.C. 154(b) by 21 days.

(21) Appl. No.: 10/061,601

(22) Filed: Jan. 31, 2002

(65) Prior Publication Data
US 2003/0142947 A1 Jul. 31, 2003

(51) Int. Cl.⁷ .................................................. G02B 6/00
(52) U.S. Cl. .......................................... 385/140; 385/60
(58) Field of Search ............................. 385/140, 52, 60

(56) References Cited

U.S. PATENT DOCUMENTS

| 4,544,234 A | * | 10/1985 | DeVeau et al. | 385/98 |
| 4,691,986 A | * | 9/1987 | Aberson et al. | 385/66 |
| 4,986,627 A | * | 1/1991 | Boscher et al. | 385/140 |
| 4,989,946 A | * | 2/1991 | Williams et al. | 385/16 |
| 5,031,994 A | * | 7/1991 | Emmons | 385/16 |
| 5,136,681 A | * | 8/1992 | Takahashi | 385/140 |
| 5,621,835 A | * | 4/1997 | Takahashi et al. | 385/78 |
| 5,734,778 A | * | 3/1998 | Loughlin et al. | 385/140 |
| 5,805,760 A | * | 9/1998 | Serafini et al. | 385/140 |
| 6,107,856 A | * | 8/2000 | Bitting | 327/307 |
| 6,130,984 A | * | 10/2000 | Shen et al. | 385/140 |
| 6,311,010 B1 | * | 10/2001 | Medeiros | 385/140 |
| 6,341,191 B1 | * | 1/2002 | Takahashi | 385/140 |

* cited by examiner

Primary Examiner—Michael P. Stafira
Assistant Examiner—Juan D Valentin
(74) Attorney, Agent, or Firm—Thomas, Kayden, Horstemeyer & Risley, LLP

(57) ABSTRACT

A variable attenuation device for optical signal transmission has first and second ferrules or plugs having abutting end faces, one of the ferrules being rotatable with respect to the other while axial alignment therebetween is maintained. Each ferrule or plug has an axial bore aligned with the other and contains the end of an optical fiber, with a fiber having a smaller diameter than the diameter of the bore in which it is contained so that the fibers may have decreased engagement with each other when there is relative rotation of the ferrules although the ferrule bores remain aligned.

3 Claims, 2 Drawing Sheets

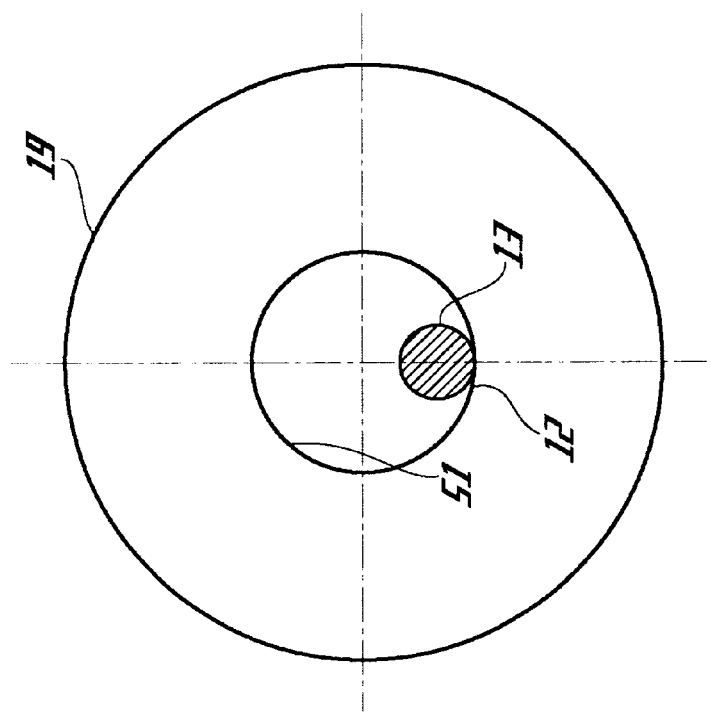
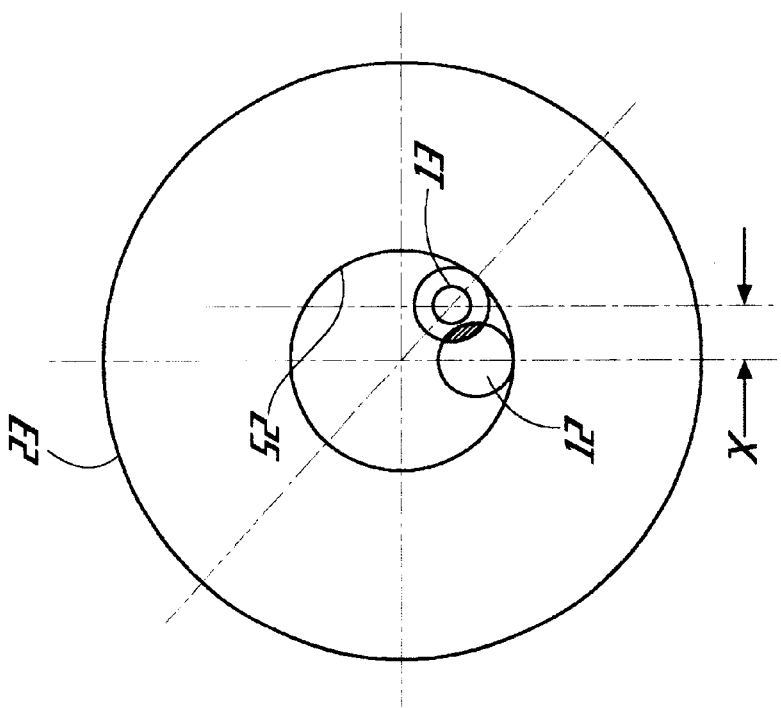

VARIABLE ATTENUATOR FOR OPTICAL FIBER APPLICATIONS

FIELD OF THE INVENTION

This invention relates to end-to-end connection of optical fibers and, more particularly, to a variable attenuator for use in such connections.

BACKGROUND OF THE INVENTION

Fiber optics has become, in most cases, the preferred mode of signal transmission, especially where the signals are in the higher frequencies. Optical fibers produce greatly increased bandwidth over conventional electrical conductors, and are relatively immune to ambient conditions that can disrupt electrical signal transmission. The numerous advantages of optical fibers come with a price, however. Whereas with electrical conductors, splicing may be had by simply butt welding, soldering, or otherwise joining the ends of the conductors being spliced, such is not presently possible with optical fibers, which have a diameter of, for example 125 microns and a core diameter of from 6 to 30 microns, and, in a satisfactory splice, must permit light transmission with a minimum of insertion loss while providing a stable junction. As a consequence, there has been a constant and ongoing effort to achieve, in a connector splice arrangement, an alignment of the butting ends of the fibers to minimize insertion loss. In addition to alignment, the width of the gap between the fiber ends and the surface condition of the ends are factors which must be considered in reducing or minimizing loss. The prior art arrangements are, for the most part, dependent upon or directed toward the centering of the fiber cores, and in most instances, the fibers are contained in ferrules which have centered fiber containing bores therein. On the other hand, in U.S. Pat. No. 4,544,234 of DeVeau et al., the fibers are contained in a slotted tube and centered prior to their being cemented in place within the slot. Such an arrangement does not require centering of the bores of the ferrules, but it does not permit relative movement between the fibers for optimum transmission after the fibers are cemented in place.

In U.S. Pat. No. 4,691,986 of Aberson et al., the disclosure of which is incorporated herein by reference, there is shown an arrangement wherein alignment of the fiber containing bores of plugs or ferrules is achieved, thereby obviating at least to a large extent alignment of the fiber cores. The invention of that patent involves the use of "contiguous" plugs derived from contiguous segments of tubular stock, with the contiguous ends being the mating ends, with the rotational relationship between the plugs being that existed prior to cutting or sectioning of the tubular stock. With such an arrangement, the fiber containing bores are automatically aligned. It doesn't matter if the bores are slightly eccentric relative to the outer diameter of the plugs, they will still be aligned, thereby enabling alignment of the fiber cores. The invention of that patent is usable in almost any of the large variety of prior art connectors wherein the fibers are contained within ferrules or plugs.

The foregoing is directed to the general problems inherent in most fiber connectors of achieving proper fiber alignment in connectors or splices. These problems also exist in various optical fiber components, such as, for example, variable attenuators. In U.S. Pat. No. 4,986,627 of Boscher et al., there is shown a variable attenuator arrangement that has abutting ferrules having substantially identical outer diameters, but with fiber containing bores which are eccentric with respect to the outer diameters. The bores, each of which has a diameter substantially the same as the outer diameter of the fiber contained therein, are rotatable relative to each other to vary the alignment of the fibers relative to each other and thereby to vary the attenuation by increasing or decreasing the offset between the fiber cores. Such an arrangement requires, for optimum performance, that, at least one rotational position, the ferrule bores are substantially aligned, thereby aligning the fiber cores at least to the extent possible with whatever eccentricity may exist for the fiber cores themselves.

In addition to arrangements such as shown in Boscher et al, other prior art variable attenuators make use of air gaps and/or angled ferrule (and fiber) ends. Ideally, a variable attenuator should provide the needed or desired attenuation, should have low return loss, and should have stable performance in high power systems.

SUMMARY OF THE INVENTION

The present invention, hereinafter shown as embodied in a variable attenuator, overcomes or obviates many of the shortcomings of the prior art, as enumerated hereinbefore, while providing reliable desired variations in the attenuation of signals passing therethrough. It should be recognized that in many instances some level of attenuation may be desirable in order to achieve a power balance among several related transmission lines rather than simply a maximum signal power throughput.

The variable attenuator embodying the principles of the invention comprises a fiber connector having a ferrule or glass capillary mounted in a stationary holder and a butting ferrule mounted in a rotatable holder. Each ferrule has a longitudinal bore extending therethrough, and the bores are axially aligned, such as in the manner of the ferrules or plugs shown in the Aberson et al. patent.

Each ferrule bore contains an optical fiber which, in accordance with a feature of the invention, has a diameter that is less than the inside diameter of the ferrule bore to the extent that, when the fibers are in place within the ferrules, rotation of the one ferrule will decrease or increase the degree of engagement of the two fiber ends and of the fiber cores, thereby increasing or decreasing the amount of attenuation therebetween. Initially, the fibers, the ends of which are ground and polished, are aligned such as in the manner disclosed in the DeVeau et al. patent to produce maximum transmission and cemented in place to the respective inner walls of the ferrule bores. Because the diameter of each ferrule bore is greater than the outer diameter of the fiber, the fibers are not co-axial with the bores containing them, and relative rotation of the ferrules produces relative displacement of the fiber ends, thus attenuating the signal being transmitted. The diameter of each ferrule bore is such that the fiber cores contained therein can be transversely separated by approximately the diameter of the fiber core, providing attenuation levels of from 0 dB to approximately −40 dB while maintaining low return loss.

DESCRIPTION OF THE DRAWINGS

FIG. 2A is a diagrammatic end view of a ferrule having mounted therein an optical fiber; and FIG. 2B is a diagrammatic end view of the ferrule and demonstrating the effect of rotation of the other ferrule.

DETAILED DESCRIPTION

Figure 1:
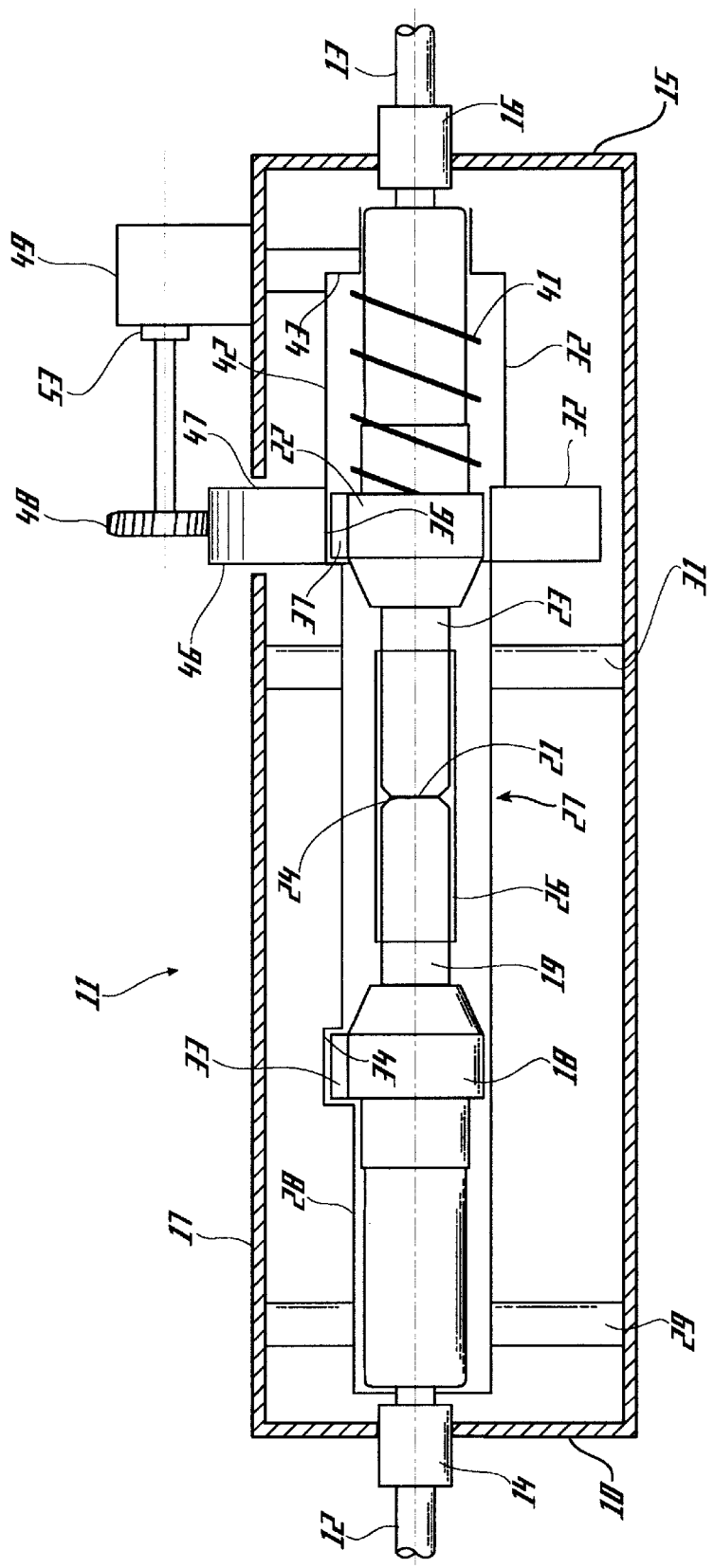
FIG. 1 is a diagrammatic elevation view of the variable attenuator of the invention.

FIG. 1 is a diagrammatic elevation view of the invention as embodied in a variable attenuator 11 which is a stand alone unit for insertion into a transmission line between connector terminated buffered optical fibers 12 and 13. Fibers 12 and 13 are coupled into unit 11 by connector and adapter combinations 14 and 16 respectively, which are shown diagrammatically as blocks, intended here to be representative of any of a number of such combinations known in the art, and which, preferably, are mounted in the ends 10 and 15 of an outer housing 17, which may be of any suitable material such as metal or plastic.

The attenuator assembly comprises a fixed rotary splice housing 18 which terminates in a plug or ferrule 19 which contains the end of fiber 12 and which is ground and polished to a flat surface 21 approximately normal to the centerline of the attenuator 11. A movable rotary splice housing 22 is axially aligned with housing 18 and terminates in a second plug or ferrule 23 which contains the end of fiber 13 and which is ground and polished to a flat surface 24 which abuts surface 21 preferably over the entire area thereof. Ferrules 19 and 23 may be made of any of a number of suitable materials known in the art, such as glass or ceramic. The ferrules or plugs 19 and 23 are preferably covered and held in alignment, especially in the junction region of end faces 21 and 24, by a sleeve 26 of metal or other suitable material which, preferably, is a tight slip fit for the ferrules. The attenuator assembly as thus far described is contained in a housing 27 having a first, stationary part or member 28, mounted to outer housing 17 by any suitable means such as brackets 29, 31, and a movable part or member 32 which is rotatable with respect to member 28. Rotary splice housing 18 is prevented from rotating within member 28 by a key 33 thereon, which fits in a keyway 34 in member 28. It is to be understood that other means for preventing rotation of member 18 might readily be used, that shown here being one alternative. Movable member 52 likewise has a similar keyway 36 into which a key 37 on rotary splice housing 22 fits. Member 32 is rotatably attached to member 28, and, when rotated with respect thereto, causes splice housing 22 to rotate also, and as a consequence, plug or ferrule 23 to rotate relative to plug or ferrule 19. In order that the faces 21 and 24 of the ferrules 19 and 23 be maintained in butting engagement, a coil spring 41 is housed in an enlarged portion 42 of member 32 and bears against an enlarged portion of housing 22 and the rear wall 43 of member 32 as shown. The dimensions of the spring 41 and the enlarged portion 42 of member 32 are such that the spring 41 is under compression when the apparatus is assembled, thereby holding face 24 in engagement with face 21.

Rotation of portion or member 32 is by means of an enlarged control wheel 46 which forms part of member 32 and which penetrates to the exterior through a slot 47 in outer housing 17. Rotation of the wheel produces rotation of member 32. Wheel 46 may be a knurled wheel or, for example, a spur gear or worm driven gear and can be rotated manually or by a driving wheel, gear, or worm 48 driven by a control member 49, preferably a motor. Inasmuch as very small displacement of the wheel 46 will produce substantial variation in attenuation it is preferable, although not necessary, that a gearing arrangement for moving wheel 46 be used.

FIGS. 2A and 2B are diagrammatic views of the two ferrules 19 and 23 superimposed demonstrating how rotation of the movable rotary splice housing 22 results in variation of the impedance between the two fibers 12 and 13. The figures are not to scale, or even relative scale, but are exaggerated views of the relationship between the ferrules 19 and 23 and the fibers 12 and 13. As discussed hereinbefore, the ferrules 19 and 23 have bores 51 and 52 respectively, which are preferably aligned with each other in, for example, the manner disclosed in the aforementioned Aberson et al. patent. In the assembly 11 of FIG. 1, the sleeve 26 functions to hold them in alignment. The bores 51 and 52 contain stripped ends of fibers 12 and 13 respectively, each of which is a smaller diameter than its respective bore. For example, the diameter of each bore may be 135 microns and the diameter of each fiber may be 125 microns. The end of fiber 12 is placed in its bore 51 against the wall thereof as shown in FIG. 2A and cemented in place by, for example, a UV curable cement. When the fiber is in place, the end face 21 of ferrule 19 which includes the end of fiber 12 is ground and polished to flatness. In like manner the end of fiber 13 is placed in bore 52 and aligned with the end of fiber 12 by means of, for example, power transmission measurements, after which it is also cemented in place and the end face 24 of ferrule 23 is ground and polished. An index matching gel may be deposited between end faces 21 and 24, and the sleeve moved into the position shown in FIG. 1 to hold ferrules 19 and 23 in place. At this point, with the fiber ends aligned as shown by the shaded area in FIG. 2A, the signal transmission across the junction is at a maximum, with a minimum of attenuation or loss. Introduction of attenuation of the signal across the junction occurs when member 22 is rotated, thereby disrupting the axial alignment of the fibers, as shown by the shaded area (the transmission area) in FIG. 2B. A transverse separation of the fiber ends, (the dimension X in FIG. 2B) is the result, and it has been found that a separation of X equal ten microns provides an attenuation level of approximately −40 dB. In order to prevent excessive rotation of ferrule 23, driving apparatus 49 may be equipped with limit stops 53, shown schematically in FIG. 1, which may be adjustable with the limits of rotation being determined by signal transmission power measurements.

The variable attenuator apparatus 11 of the invention thus provides stable performance exhibiting low return loss and accurate variations of attenuation. It is to be understood that the invention has been depicted in a preferred embodiment thereof, but that the principles thereof are adaptable to other types of fiber connectors or splices, or to modifications or variations of the apparatus shown. All such variations and modifications are intended to be included herein as being within the scope of the present invention as set forth. Further, in the claims, hereafter, the corresponding structures, materials, acts, and equivalents of all means or step-plus-function elements are intended to include any structure, material, or acts for performing the functions in combination with the other elements as specifically claimed.

What is claimed is:

1. A variable attenuation member for varying the attenuation within an optical fiber transmission line, said attenuation member comprising:

an outer housing having a first end and a second end;

an optical fiber connector member at each end of said housing;

an inner housing having a stationary portion affixed to said outer housing and a rotatable portion rotatable with respect to said stationary portion;

a first rotary splice housing contained within said stationary portion and being fixed in rotary position with respect thereto said first rotary splice member having a first ferrule projecting from one end thereof, said first ferrule having a bore therein containing the fixed end of a first optical fiber;

said second rotary splice member having a second ferrule projecting from one end thereof, said second ferrule having a bore therein containing the fixed end of a second optical fiber;

said first and second ferrules having abutting end faces wherein said bores are axially aligned with each other and said fibers are in engagement, and the diameter of said bores being sufficiently greater than the diameter of the fibers contained therein to produce a variation in the fiber end engagement upon rotation of said rotatable portion of said inner housing.

2. A variable attenuation member as claimed in claim 1 wherein said first optical fiber is connected to the connector member at said first end of said outer housing and said second optical fiber is connected to the connector member at said second end of said outer housing.

3. A variable attenuation member as claimed in claim 1 wherein said end faces are in abutment over substantially their entire area regardless of relative rotational displacement of said ferrules.

* * * * *